Feb. 16, 1926.
F. X. GOVERS ET AL
BALANCED PACKING FOR SHAFTS
Filed May 22, 1919
1,572,922
Fig. I.
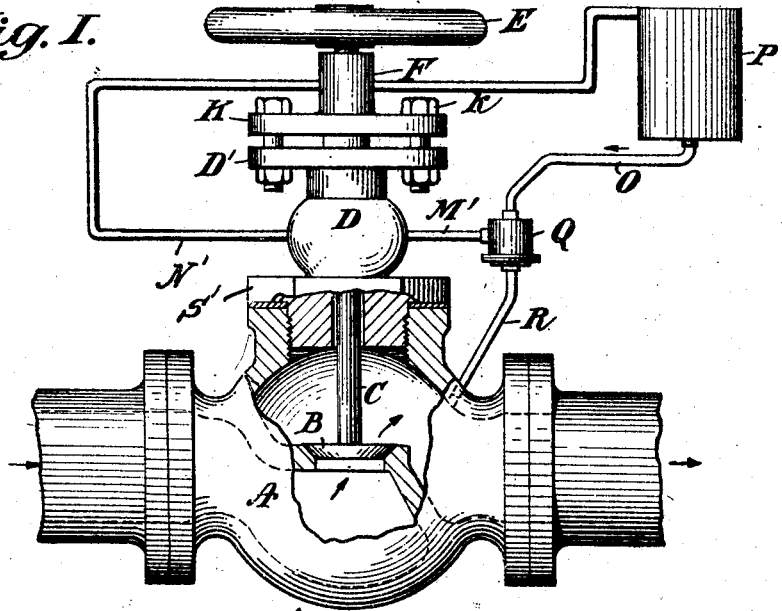
Fig. II.
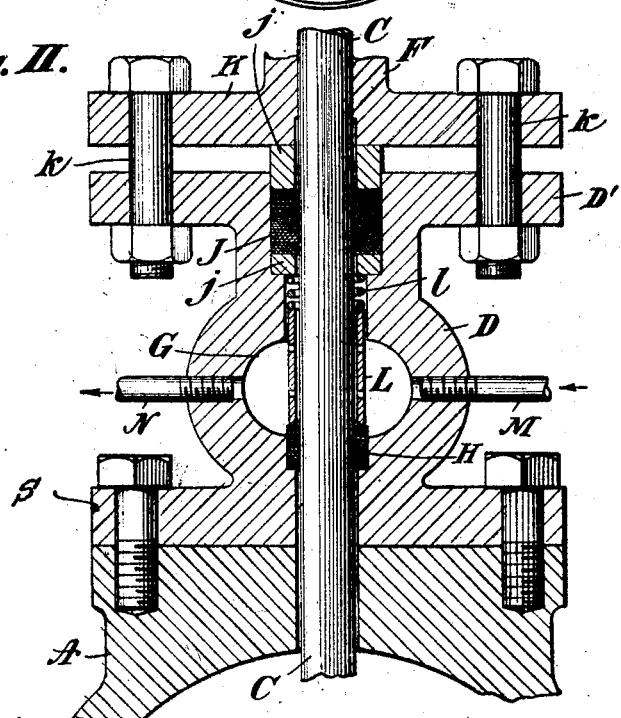
Attest:
Inventors:
Francis X. Govers and
Edward R. Hewitt.
By their Attorney Patented Feb. 16, 1926.

1,572,922

UNITED STATES PATENT OFFICE.

FRANCIS X. GOVERS, OF NEW YORK, N. Y., AND EDWARD R. HEWITT, OF MIDVALE, NEW JERSEY.

BALANCED PACKING FOR SHAFTS.

Application filed May 22, 1919. Serial No. 298,847.

*To all whom it may concern:*

Be it known that we, FRANCIS X. GOVERS and EDWARD R. HEWITT, both citizens of the United States, respectively residing at 800 Riverside Drive, city, county, and State of New York, and Midvale, county of Passaic, State of New Jersey, have invented certain new and useful Improvements in Balanced Packing for Shafts, of which the following is a specification.

This invention relates to means for packing moving parts such as valve stems or shafts or any members passing thru a wall or part of an apparatus confining fluids. In particular, among its objects are the provision of packing effective against the escape of liquids or gases in or generated within an apparatus, while at the same time permitting lubrication of a moving member in an efficient manner, when necessary, and to provide such packing effective at all pressures and temperatures involved, while the packing is easily adapted and adjusted and replaced to meet the practical conditions.

This is done by means of a double packing, inner and outer, with a pressure chamber between the two, such pressure chamber affording means for balancing the inner packing as by introducing or maintaining a liquid in the pressure chamber maintained at a suitable pressure, as, for example, substantially the same as the pressure generated or maintained in the apparatus itself.

In the operation of apparatus wherein gases or liquids, either hot or cold, are used under pressure and in particular in such apparatus as it is necessary to have a moving part or member, whether such movement be intermittent, as in the case of a valve stem, reciprocating as in the case of a piston stem, or rotating as in the case of a shaft drive, many difficulties are encountered in keeping the apparatus gas-tight as the stuffing boxes in use are not effective in the case of hot gases and frequently fail to hold the pressure, without leaking, even at comparatively low temperatures, when high pressures are used.

Also in the use of the present type of stuffing boxes troubles arise in the lubrication of moving parts, where such moving parts are in continual motion and in contact with the packing, this trouble being most pronounced where the confined material is hot or has a solvent or disintegrating action on the lubricant in use.

The liability to leakage increases with the pressure or temperature and it becomes necessary to make the stuffing boxes for high pressure or high temperature uses, very long and of such shape as to admit of the use of considerable packing. Thus the increased amount of and length of packing increases the friction with resultant difficulties in supplying adequate lubrication and in the case of leakage of hot gases as superheated steam and of poisonous or otherwise deleterious gases or liquids the tightening or repacking of these stuffing boxes, while in operation, is attended with considerable risk.

With the growth of the chemical industry many operations are now carried out under considerable pressure in apparatus provided with means for stirring or agitating the materials under treatment, which stirring device is provided with a stuffing box of the regular type. Many of the materials so treated are either inflammable, in their liquid or vapor phase, or in such phases are poisonous or deleterious to the user of the apparatus or to the workmen in the immediate vicinity and therefore any leaks in any part of the apparatus are a source of danger and must be guarded against.

In our stuffing box the liquid in the pressure chamber may, in the case of hot gases or liquids being used in the apparatus, be circulated and cooled. It may be of such a nature or material as will lubricate the parts of a moving member necessary to be lubricated or it may be of such a material or nature as will absorb or render harmless any inflammable, poisonous or deleterious gases or liquids that may go from the apparatus thru the inner packing into the material contained in the pressure chamber.

The particular form of the construction of and the material used in the pressure chamber may be modified to suit the particular characteristics of the conditions involved in and the desired application.

We have illustrated one embodiment of our invention in the accompanying drawings, in which:

Fig. I is a side elevation, in part fragmentary section, showing a packing box in its relation to a globe valve and its stem.

Fig. II is a section on the axis of a valve stem or shaft showing in enlarged scale the balanced packing construction.

As illustrated, the globe valve A has a valve B with a stem C. A packing box D surrounds the stem being fastened to the top of the globe valve A, and at the upper protruding end the valve stem C has a hand-wheel E to operate it, with any suitable threading within the boss F, or otherwise, to effect the desired movement of the valve stem.

The stuffing box D has a chamber G and a recess accommodating light packing H at one side of the chamber, while at the upper side of the box D a recess accommodates heavier packing J, held between a washer $j$ and a gland or washer $j'$, the latter being pressed against the packing by means of the flange K drawn down by the bolts $k$ to the upper flange D' of the packing box D.

The packing H is held in place by a collar or sleeve L under suitable pressure by a spring $l$ engaging the top of the sleeve and the bottom of the washer $j$.

No particular pressure is required on this light packing because of the internal pressure in the chamber G, which is provided for the purposes of our invention.

The pressure in the chamber G, as shown in Fig. II of the drawings, is provided by a pipe M entering one side with an exit pipe N at the other side, which pipes lead from any suitable fluid circulating pump or device not shown. This affords the means for pressure, for example such as pumping oil therein at any desired pressure to create an internal pressure in the chamber G to be exerted on top of the packing H, so that the pressure on top of the packing will balance the pressure due to the fluid inside of the valve A, thereby preventing any escape of the fluid from the valve chamber about the valve stem. For example, in the case of a steam valve the steam pressure in the valve chamber would be balanced by oil pressure at the other side of the packing H, which oil is circulated under the desired pressure thru the chamber G, and by cooling while circulating any objectionable rise in temperature of the oil may be prevented.

As shown in Fig. I, the pipe M' connecting with the packing box is supplied by a pipe O from an accumulator P of any suitable form. The control of the pressure of the fluid passing into the chamber G is in this form accomplished by a diaphragm pressure valve Q which in turn is controlled thru the pipe R making the diaphragm valve subject to the pressure at the interior of the globe valve. In this way the diaphragm valve, in any preferred form, regulates the pressure in the chamber G as supplied thru the pipe M', so that the pressure on the outer side of the packing H is substantially the same as the pressure in the interior or chamber of the globe valve A.

For example, we may consider the case of a steam pipe with a valve intended to control steam under a pressure of 500 lbs. and a superheat of 300° Fahr. Ordinary packing leaks after very limited use, heating the valve stem in the packing so as to rapidly deteriorate the packing, and the handwheel of the valve is heated and the expansion of other metal parts due to undue heating causes further complications.

Our construction provides the light packing H which is held in place by any suitable means, such as the sleeve L, the pressure on that packing being such as to keep it suitably positioned, but without any compression such as a gland. The predetermined pressure is then provided in the chamber G and is so regulated as to balance the pressure on one side of the packing H against the pressure exerted from the other side by the steam. As shown, this regulated pressure in chamber G is varied by the pressure created by the steam or other pressure in the valve communicating through pipe R to the diaphragm valve Q, where any usual form of diaphragm pressure valve provides the suitable control. The outer end of the stem has the packing J surrounding it, which is remote from the high pressure superheated steam, and this packing J held tight by means of suitable glands and flange, will be very durable, and can readily be made tight without interfering with the movement of the shaft C, particularly as it serves to prevent escape of the balancing fluid which would usually be oil or water or other liquid. Furthermore, the balancing fluid would be static only if no heat were involved, and as the valve is used in conjunction with a hot pressure medium, superheated steam, the balancing medium can be circulated and cooled, and thus be kept at a substantially uniformly cool temperature making the packing J effective and simple.

It will be seen that in the form shown in Fig. II the pipes M and N leading to and from the balancing chamber G may be connected in any usual manner to circulate a balancing fluid thru the chamber G. If desired the pressure of the circulating fluid will be regulated with relation to the varying pressure of the fluid in the pipe or chamber into which the valve stem or shaft penetrates. In Fig. II the shaft C, as indicated, may be a reciprocating member and the lower flange S of the stuffing box D bolted to the wall of the valve or other parts containing the fluid under pressure. In Fig. I the stem C is a revolving member such as a valve stem and the connection of the stuffing box D with the valve A, is made sufficiently large to permit the insertion of the valve stem with the valve B,—by having a cylindrical projection from the flange S' of the packing box D screwed into the wall of the valve.

Any form of regulating valve is used which, when regulated for the particular case, will admit the required pressure to the inside of the packing box D through the pipe M' and which will be subject to the variations of the pressure of the control fluid in the pipe or valve as regulated by the interconnecting pipe R. A pipe N' as shown extending from the opposite sides of the chamber of the packing box D, may be similar to pipe N, shown in Fig. II, to connect the chamber G for a circulation.

Any form of packing material may be used to suit particular cases, and various modifications may be made in arrangement, dimensions and material without departing from the spirit of our invention.

What we claim and desire to secure by Letters Patent is:

1. In combination with a valve controlling the flow of fluid under pressure, a valve stem and packing therefor comprising one set of packing, mechanical means for securing said packing under predetermined minimum pressure, a chamber surrounding the valve stem between said packing and the valve and a secondary set of packing between said chamber and the valve, means for locating said second set of packing in the predetermined position subject to the pressure in said chamber, connections on the outlet side of the valve casing between said chamber and the valve casing whereby upon the opening of the valve the fluid pressure in the valve casing will become effective in the chamber and upon the secondary set of packing.

2. In combination with a valve, a stem for said valve and packing for said stem comprising one set of mechanically compressed packing, and a second set of packing mechanically located but subject to fluid pressure, a chamber surrounding the valve stem between the mechanically compressed packing and the valve arranged to bring fluid pressure to bear upon the second set of packing, connections to and from said chamber adapted to provide ample and continuous circulation for the abstraction of heat and like purposes from the valve stem in proximity to said packing, and means controlled by the pressure on the outlet side of said valve for regulating the pressure in said chamber.

3. The combination of a pressure casing provided with an opening, a shaft movably mounted in the opening, packing for the shaft in the opening, a chamber surrounding the shaft beyond the packing, means for circulating a fluid through said chamber, and means acted upon by the fluid in the pressure casing for transmitting the pressure of the fluid therein to the fluid in the circulating means.

4. In combination with a high-pressure system having a movable stem, a packing for said stem comprising two parts and an intermediate pressure chamber serving to balance the pressure on one of said packing parts, a fluid in said chamber separate from said high-pressure system, means for circulating said fluid through said chamber, and means controlled by said high-pressure system for regulating the pressure of said fluid.

5. A casing having a shaft opening, packing for the shaft comprising a chamber about said shaft on one side of the shaft opening, packing material surrounding the shaft on both sides of said chamber, the packing on one side being securely held in operative position by mechanical means and subject to increased pressure from fluid pressure in said chamber, the packing on the other side being balanced subject to fluid pressure in said chamber, circulating means connected with said chamber, and a circulating fluid of a character adapted to absorb any leakage through said balanced packing.

6. A valve having a stem projecting through the side of the valve casing, packing for said valve stem comprising a substantial chamber surrounding the stem for permitting the circulation of fluid, packing on the valve side of said chamber made effective by fluid pressure within said chamber and fluid pressure connections to said chamber made effective upon the opening of the valve, packing on the opposite side of the chamber with mechanical means to give said packing an initial pressure but subject to any increased fluid pressure from said chamber.

7. A valve, a stem projecting from the side of the valve casing, a chamber surrounding said stem and formed with a flange for attachment to the valve casing, packing for said stem, a recess for said packing on the valve side of said chamber and a counterbore on the opposite side of the chamber to permit the insertion therethrough of the packing for the opposite side, packing for said counterbore of greater diameter than the first mentioned packing and means to effect mechanical attachment of and pressure on said second packing, substantially as set forth.

8. In combination with a valve, packing for the valve stem, a collar and a spring cooperating to hold said packing in position, a valve stem, a chamber surrounding said valve stem, a recess on the valve side of said chamber for receiving said packing and a bore for the introduction of said packing on the opposite side of said chamber, a relatively larger second packing and means to hold said second packing under predetermined pressure, and means for circulating liquid in said chamber subject to the pressure of the fluid within the valve casing.

In testimony whereof, we have signed our names to this application this 13th day of May 1919.

FRANCIS X. GOVERS.
EDWARD R. HEWITT.